Sept. 3, 1946.　　　　F. W. DURGIN　　　　2,406,999
CONTINUOUS RANGE FINDER
Filed April 23, 1943

INVENTOR,
Franklin W. Durgin

Patented Sept. 3, 1946

2,406,999

UNITED STATES PATENT OFFICE 2,406,999

CONTINUOUS RANGE FINDER

Franklin W. Durgin, Washington, D. C.

Application April 23, 1943, Serial No. 484,279

4 Claims. (Cl. 33—49)

This invention relates to improvements in continuous range finders and more specifically to a gun-coupled range finder particularly well adapted for anti-aircraft use.

The primary object of the invention is to provide a gun-coupled range finder which will automatically maintain the range finder at the proper angle to the gun when the gun is properly rotated and the range finder is properly focused on a moving target, such as an airplane.

Other objects and advantages of the invention will become apparent during the course of the following detailed description, taken in connection with the accompanying drawing, forming a part of this specification, and in which drawing, Figure 1 is a diagrammatic side view of the gun-coupled range finder focused on an airplane in flight.

Figure 1:
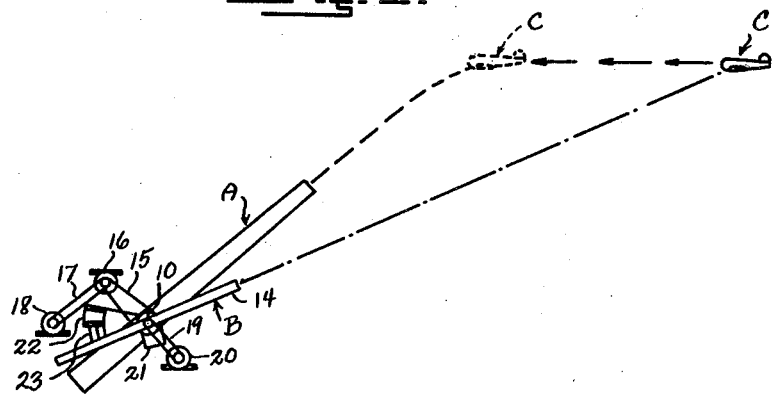
Figure 2:
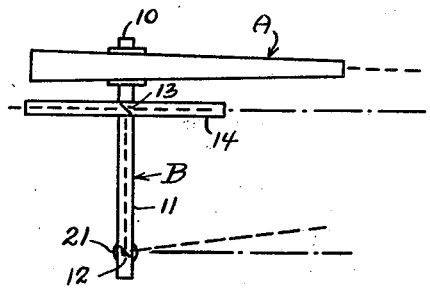
Figure 2 is a diagrammatic plan view of the gun-coupled range finder.

In the drawing, which for the purpose of illustration shows only a preferred form of the invention, and wherein similar reference characters denote corresponding parts throughout the several views, the letter A generally designates the gun, to which is coupled the range finder B, focused on a moving target, such as the airplane C.

Any suitable range finder B, such as shown in U. S. Patent #279,273 to Patterson or #1,968,002 to Nowicki et al., may be employed. There is disposed, in alignment with the axis 10 of elevation of the gun A, the lateral sight member 11 of the range finder B having a conventional rotatable light deflector 12, constituting the movable component of the range finder. A semi-transparent mirror 13 disposed at an angle of 45° within the longitudinal sight member 14 at the intersection of the lateral sight member 11 constitutes the fixed component of the range finder.

Any suitable motion transmitting means, such as a belt 15, is provided between the axis of rotation of the range finder and the drive shaft of a speedometer 16 whose speed indicating shaft is connected, as by a belt 17, to the shaft of a suitable rheostat 18.

Any suitable motion transmitting means, such as a belt 19, is provided between the axis of rotation of the range finder B and the shaft of a suitable rheostat 20.

The rotatable light deflector 12 is directly connected to the shaft of a suitable rheostat 21.

Figure 3:
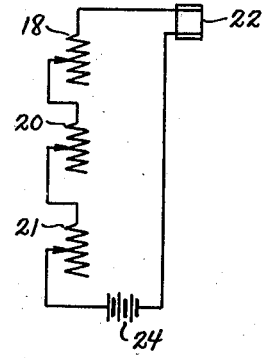
Figure 3 is a diagrammatic view of an electrical circuit preferably forming a part of the invention.

Attached to the gun A is a solenoid 22, in series circuit with the rheostats 18, 20 and 21, the armature 23 of the solenoid being fastened to the longitudinal sight member 14. A suitable source of current 24 is provided in the circuit, as shown in Figure 3.

The rheostats 18, 20, and 21 have resistances which are so related to the factors of aircraft speed, angular elevation, and aircraft distance, that the current in the circuit is varied in response to changes in the speed, angular elevation, and distance of an approaching aircraft whereby the solenoid will dispose the sight member 14 in proper angular relation to the gun A, which is angularly rotated, as by the gunner, at a rate just sufficient to retain the images of the approaching aircraft in the range finder B.

As the speed indicating shaft of the speedometer 16 turns responsive to apparent or actual increase in speed of the aircraft, the shaft of the rheostat 18 is automatically turned so as to increase the current flow through the solenoid 22, whereby the angularity between the gun and sight member 14 is increased.

As the sight member 14 turns toward the vertical, the shaft of the rheostat 20 is gradually turned to reduce the current flow so as to compensate for any advancement of the rheostat 18 that is due to apparent but not actual increase in speed of the approaching aircraft, it being understood that the sight member 14 is accelerated as it approaches the vertical when the speed of the aircraft is constant.

As the light deflector 12 is turned or otherwise controlled by the gunner to retain the dual images of the approaching aircraft in proper alignment in the range finder B, the shaft of the rheostat 21 is automatically turned to increase the current flow through the solenoid, whereby the angularity between the gun A and the sight member 14 is increased.

Thus, the relationship of the sight member 14 to the gun A depends on the speed, angle of elevation, and distance of the approaching aircraft C relative to the location of the gun A.

Various changes may be made in the form of invention herein shown and described without departing from the spirit of the invention or the scope of the following claims.

I claim:

1. The combination with a gun rotatable about a given axis, of a range finder mounted for rotation about the axis of rotation of the gun, said range finder provided with a movable distance-indicating element, a single power actuated means for controlling the angular relationship of the gun and range finder substantially in accordance with the amount of power actuating said control means, a source of energy for actuating said control means, a speedometer driven by rotation of the range finder, and plural jointly acting means for varying the amount of energy delivered to said control means including means controlled by said speedometer, means controlled by said movable element, and means responsive to changes in the angular position of the range finder.

2. The combination with a gun rotatable about a given axis, of a range finder mounted for rotation about the axis of rotation of the gun, said range finder provided with a movable element for adjustment to a position indicative of the distance to the target, an electro-motive device for controlling the angular relationship of the gun and range finder substantially in accordance with the amount of energy actuating said device, a source of current for actuating said electro-motive device, a speedometer driven by rotation of the range finder, and plural jointly acting means for regulating the flow of current from said source to said electro-motive device comprising means controlled by said speedometer, means controlled by said movable element, and means responsive to changes in the angular position of said range finder.

3. The combination with a gun rotatable about a given axis, of a range finder rotatable about the axis of rotation of the gun, said range finder being adjustable for target distance, a single power actuated means controlling the angular relationship of the range finder to the gun substantially in accordance with the instantaneous value of the power actuating said control means, a source of energy actuating said control means, and plural jointly acting means varying the amount of energy delivered to said control means including means responsive to changes in the target-distance adjustment of the range finder.

4. The combination with a gun rotatable about a given axis, of a range finder rotatable about an axis extending in the direction of the said axis of rotation of the gun, said range finder provided with a movable target-distance finding element, a solenoid, a source of current energizing the solenoid, said solenoid controlling the angular relationship of the range finder to the gun substantially in accordance with the amount of energy supplied to the solenoid, a speedometer, means driving the speedometer at a rate depending on the rate of rotation of the range finder, and a plurality of serially connected impedances for regulating the flow of current from said source to said solenoid and including a rheostat controlled by said speedometer, a rheostat controlled by movement of said distance-finding element, and a rheostat responsive to changes in the angular position of the range finder.

FRANKLIN W. DURGIN.